United States Patent
Haelion

(10) Patent No.: US 9,838,368 B2
(45) Date of Patent: Dec. 5, 2017

(54) PORT SCRAMBLING FOR COMPUTER NETWORKS

(71) Applicant: CYBER 2.0 (2015) LTD., Yavne (IL)

(72) Inventor: Erez Kaplan Haelion, Rehovot (IL)

(73) Assignee: CYBER 2.0 (2015) LTD., Yavne (IL)

( * ) Notice: Subject to any disclaimer, the term of this patent is extended or adjusted under 35 U.S.C. 154(b) by 0 days.

(21) Appl. No.: 15/304,052

(22) PCT Filed: Aug. 25, 2016

(86) PCT No.: PCT/IL2016/050931
§ 371 (c)(1),
(2) Date: Oct. 13, 2016

(87) PCT Pub. No.: WO2017/033194
PCT Pub. Date: Mar. 2, 2017

(65) Prior Publication Data
US 2017/0244686 A1    Aug. 24, 2017

(30) Foreign Application Priority Data

Aug. 27, 2015    (IL) .......................................... 240909

(51) Int. Cl.
*H04L 9/32* (2006.01)
*H04L 29/06* (2006.01)
(52) U.S. Cl.
CPC .......... *H04L 63/061* (2013.01); *H04L 63/068* (2013.01); *H04L 63/145* (2013.01)
(58) Field of Classification Search
None
See application file for complete search history.

(56) References Cited

U.S. PATENT DOCUMENTS 5,903,721 A    5/1999  Sixtus
6,549,538 B1   4/2003  Beck
(Continued)

FOREIGN PATENT DOCUMENTS

JP    2004112018 A    4/2004

OTHER PUBLICATIONS

International Search Report for PCT/IL2016/050931 from ISA/IL dated Nov. 27, 2016.

*Primary Examiner* — Brandon Hoffman
(74) *Attorney, Agent, or Firm* — Koffsky Schwalb LLC; Mark I. Koffsky

(57) ABSTRACT

A method, system and computer program product providing port scrambling for securing communications in internal computer networks are disclosed. A transformation function is applied on an identifier of a first port at which an outgoing communication is designated to be received, whereby an identifier of a second port the outgoing communication is directed to be received at is obtained. The transformation function depends on at least one parameter shared among a plurality of devices in a computer network, whereby a device receiving the communication at the second port is enabled to apply an inverse transformation function on the identifier of the second port to obtain the identifier of the first port and redirect the communication thereto. The transformation function is applied in condition that transmittal of the outgoing communication was requested by an application program listed in a list of authorized application programs for the plurality of devices.

18 Claims, 4 Drawing Sheets

(56) References Cited

U.S. PATENT DOCUMENTS

| | | |
|---|---|---|
| 8,751,650 B2 | 6/2014 | Mittal et al. |
| 2005/0220017 A1 | 10/2005 | Brand |
| 2006/0005227 A1 | 1/2006 | Samuelsson |
| 2007/0044155 A1* | 2/2007 | Pletka .................... H04L 63/08 726/25 |
| 2011/0122880 A1 | 5/2011 | Saito |
| 2011/0246630 A1 | 10/2011 | Deutsch et al. |
| 2013/0058341 A1 | 3/2013 | Fulton |

* cited by examiner

PORT SCRAMBLING FOR COMPUTER NETWORKS

RELATED APPLICATIONS

This application is a National Phase Application of PCT International Application No. PCT/IL2016/050931, International Filing Date Aug. 25, 2016, entitled Port Scrambling For Computer Networks, which claims priority to Israel Patent Application Serial No. 240909, filed Aug. 27, 2015.

TECHNICAL FIELD

The present disclosure relates to computer network communication in general, and to port scrambling for secure network communications, in particular.

BACKGROUND

Computer networks are prevalent among many enterprises and organizations. Typically, a network environment comprises a plurality of computerized devices interconnected to one another and sharing resources, such as, for example, through common access to one or more servers connected to the network. In many cases, some or even all of the devices in the network environment are simultaneously connected also to one or more external networks, such as the World Wide Web. As a result, any of the devices in the internal network environment are made much more susceptible to various security threats and attacks, in particular the proliferation of self-propagating malicious codes, also commonly known as "viruses" or "worms". Once a device in the network becomes compromised, the infection can spread quickly to the remaining devices, causing irreparable harm.

BRIEF SUMMARY

One exemplary embodiment of the disclosed subject matter is a computer-implemented method comprising: receiving, in a computerized apparatus, a request of an application program to transmit an outgoing communication designated to be received at a destination via a first port, wherein the application program is executed by the computerized apparatus, wherein the destination is a destination external to the computerized apparatus; applying a transformation function on an identifier of the first port, whereby obtaining an identifier of a second port, wherein said applying is conditioned on the application program being listed in a list of authorized application programs for a plurality of devices in a computer network; and, directing the outgoing communication to be received at the destination via the second port; wherein the transformation function depends on at least one parameter shared among the plurality of devices, wherein the plurality of devices comprise the computerized apparatus, whereby a second computerized apparatus of the plurality of devices is enabled to apply an inverse transformation on the identifier of the second port to obtain the identifier of the first port.

Another exemplary embodiment of the disclosed subject matter is a computer-implemented method comprising: receiving, in a computerized apparatus, an incoming communication via a first port having a first port identifier, wherein the incoming communication is received from an external device via a computer network; applying an inverse transformation function on the first port identifier, whereby obtaining a second port identifier of a second port; and, redirecting the incoming communication from the first port to the second port at the computerized apparatus, wherein the inverse transformation function depends on at least one parameter shared among a plurality of devices of the computer network, wherein the plurality of devices comprise the computerized apparatus.

Yet another exemplary embodiment of the disclosed subject matter is a computerized apparatus having a processor, the processor being adapted to perform the steps of: receiving, in a computerized apparatus, a request of an application program to transmit an outgoing communication designated to be received at a destination via a first port, wherein the application program is executed by the computerized apparatus, wherein the destination is a destination external to the computerized apparatus; applying a transformation function on an identifier of the first port, whereby obtaining an identifier of a second port, wherein said applying is conditioned on the application program being listed in a list of authorized application programs for a plurality of devices in a computer network; and, directing the outgoing communication to be received at the destination via the second port; wherein the transformation function depends on at least one parameter shared among the plurality of devices, wherein the plurality of devices comprise the computerized apparatus, whereby a second computerized apparatus of the plurality of devices is enabled to apply an inverse transformation on the identifier of the second port to obtain the identifier of the first port.

Yet another exemplary embodiment of the disclosed subject matter is a computerized apparatus having a processor, the processor being adapted to perform the steps of: receiving, in a computerized apparatus, an incoming communication via a first port having a first port identifier, wherein the incoming communication is received from an external device via a computer network; applying an inverse transformation function on the first port identifier, whereby obtaining a second port identifier of a second port; and, redirecting the incoming communication from the first port to the second port at the computerized apparatus, wherein the inverse transformation function depends on at least one parameter shared among a plurality of devices of the computer network, wherein the plurality of devices comprise the computerized apparatus.

Yet another exemplary embodiment of the disclosed subject matter is a computer program product comprising a computer readable storage medium retaining program instructions, which program instructions when read by a processor, cause the processor to perform a method comprising: receiving, in a computerized apparatus, a request of an application program to transmit an outgoing communication designated to be received at a destination via a first port, wherein the application program is executed by the computerized apparatus, wherein the destination is a destination external to the computerized apparatus; applying a transformation function on an identifier of the first port, whereby obtaining an identifier of a second port, wherein said applying is conditioned on the application program being listed in a list of authorized application programs for a plurality of devices in a computer network; and, directing the outgoing communication to be received at the destination via the second port; wherein the transformation function depends on at least one parameter shared among the plurality of devices, wherein the plurality of devices comprise the computerized apparatus, whereby a second computerized apparatus of the plurality of devices is enabled to apply an inverse transformation on the identifier of the second port to obtain the identifier of the first port.

Yet another exemplary embodiment of the disclosed subject matter is a computer program product comprising a computer readable storage medium retaining program instructions, which program instructions when read by a processor, cause the processor to perform a method comprising: receiving, in a computerized apparatus, an incoming communication via a first port having a first port identifier, wherein the incoming communication is received from an external device via a computer network; applying an inverse transformation function on the first port identifier, whereby obtaining a second port identifier of a second port; and, redirecting the incoming communication from the first port to the second port at the computerized apparatus, wherein the inverse transformation function depends on at least one parameter shared among a plurality of devices of the computer network, wherein the plurality of devices comprise the computerized apparatus.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

One technical problem dealt with by the disclosed subject matter is to provide for secure communication in a computer network.

Another technical problem dealt with by the disclosed subject matter is to prevent spreading of malicious code within a computer network.

A "port" is a logical construct associated with a service or process residing on a computing platform and serves as an endpoint for different types of network communication. In some exemplary embodiments, a port is identified for each host address and communication protocol by a 16-bit number, thus a port number ranges from 0 to 65535. Generally, port numbers appear in network packets and map to specific processes or resources on the destination device that can handle or are expecting those packets. Some resources are preconfigured to listen to only certain predefined port numbers and ignore traffic associated with other ports. Typical network protocols that heavily rely on port numbers to map to resources include Transmission Control Protocol (TCP) and User Datagram Protocol (UDP). Some port numbers or port number ranges may be reserved for standard services, such as the "well-known ports" ranging from 0 to 1023 used by TCP and UDP. For example, services running the Hypertext Transfer Protocol (HTTP) protocol typically listen on port 80.

One technical solution is to selectively scramble port numbers towards which outgoing communications are directed at the transmitting end and descramble port numbers at which incoming communications are received. The scrambling is performed only for port numbers associated with approved application programs. The scrambling and descrambling are performed using one or more secret parameters shared among the network devices. The one or more secret parameters preferably include a time-varying component to decrease likelihood of an attacker "guessing" the target port number by port scanning.

One technical effect of utilizing the disclosed subject matter is to allow detection of attacks or outbreaks by identifying access attempts at regular port numbers. Furthermore, attempts to access ports that are not a scrambled version of any useful ports may also be indicative of potential unauthorized activity as authorized activity is constrained to be directed solely at scrambled ports.

Another technical effect is to prevent outspread of malicious activity that relies on human engineering. Even in case a human user is manipulated to allow access to a malicious user or code (e.g., pressing a harmful link or executing a malware sent via e-mail), malicious activity is likely to be contained in the infected device and not be spread to other devices.

Figure 1:
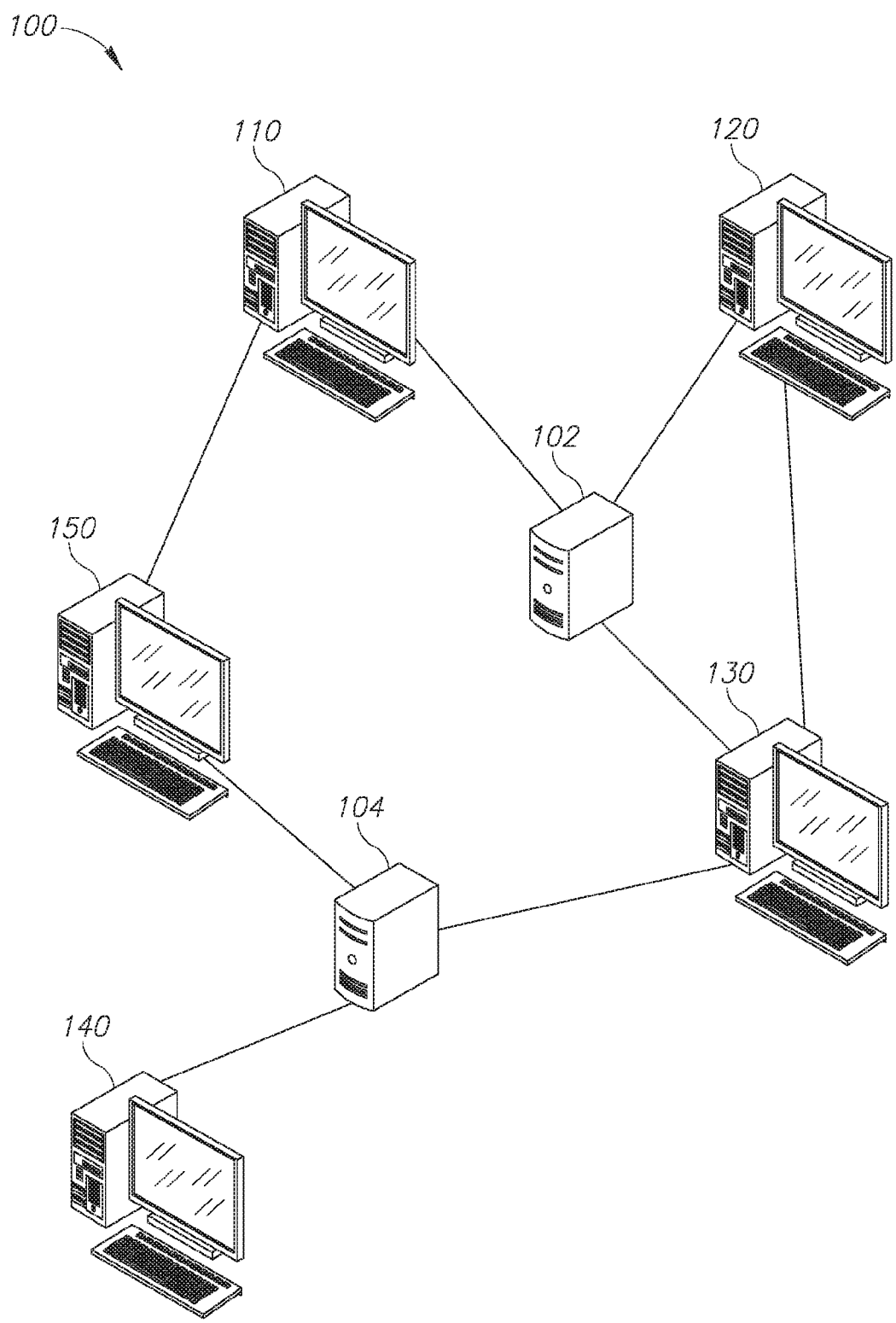
FIG. 1 shows a computer network in which the disclosed subject matter is used, in accordance with some exemplary embodiments of the subject matter.

Referring now to FIG. 1 showing a computer network in which the disclosed subject matter is used, in accordance with some exemplary embodiments of the subject matter.

In some exemplary embodiments, a Computer Network 100 may comprise a plurality of computing devices, such as Devices 110, 120, 130, 140 and 150. Computer Network 100 may comprise one or more servers, such as Servers 102 and 104. Devices 110 to 150 may be interconnected to one another, either by common access to one of Servers 102 and 104 or directly, such as through using a network switch, a hub, or the like. For example, Devices 110, 120 and 130 are connected to Server 102, while Devices 140 and 150, as well as Device 130 are connected to Server 104. In addition, Device 110 is directly connected to Device 150 and Device 120 is directly connected to Device 130.

In some exemplary embodiments, Computer Network 100 may be an intranet network of an organization. Computer Network 100 may be connected to an external network, such as the Internet (not shown). In some cases, Computer Network 100 is connected to the external network by a router, switch, server or the like, which may or may not be configured to provide some security measures to prevent malicious activity. In one embodiment, the switch comprises a firewall that prevents access of undesired entities.

Figure 2:
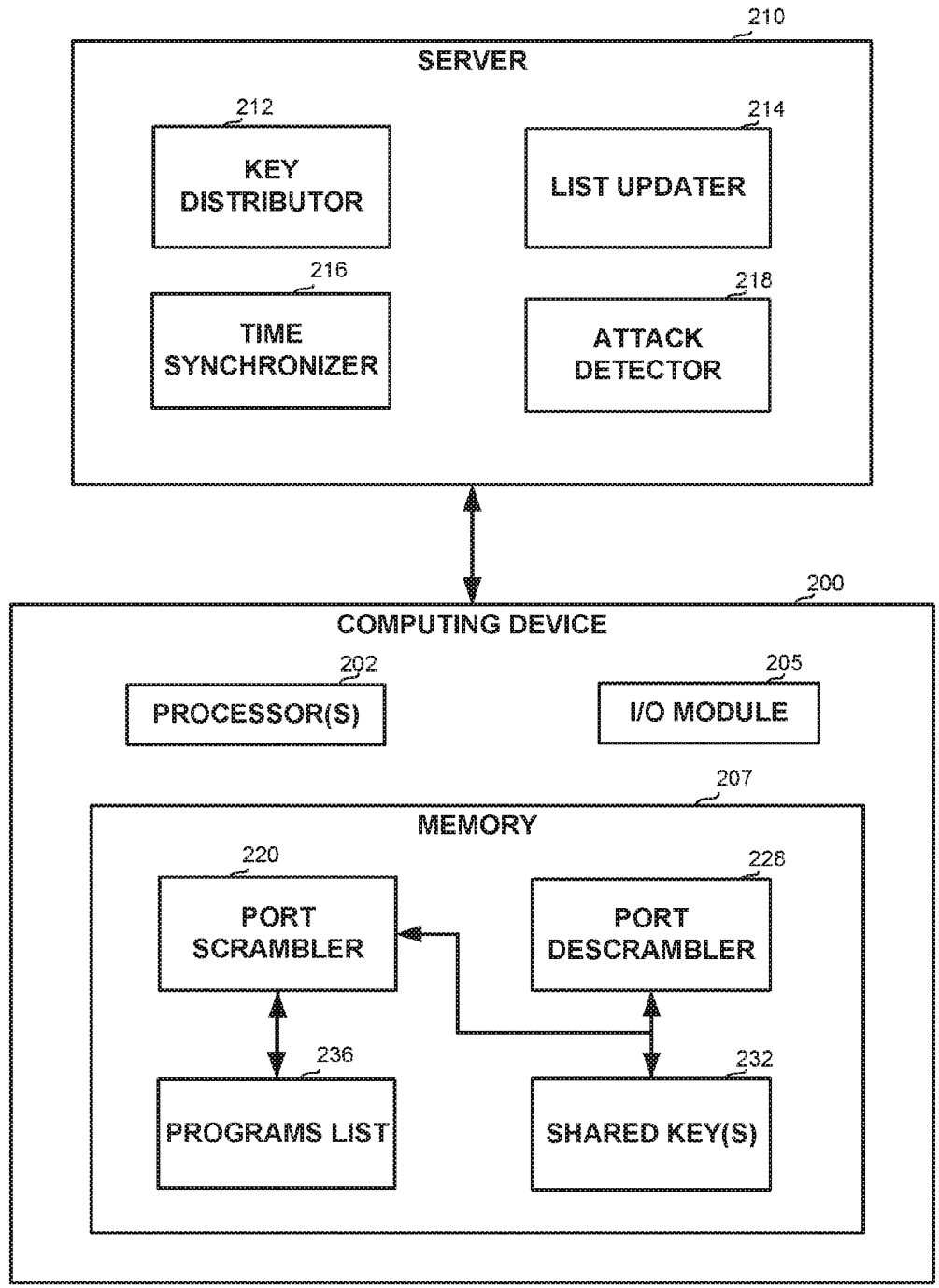
FIG. 2 shows a block diagram of a system, in accordance with some exemplary embodiments of the disclosed subject matter.

Referring now to FIG. 2 showing a block diagram of a system in accordance with some exemplary embodiments of the disclosed subject matter. The system comprises a Computing Device 200, such as Devices 110 to 150 of FIG. 1, and may be configured to provide for port scrambling, in accordance with the disclosed subject matter. In some exemplary embodiments, the system further comprises a Server 210, such as Servers 102 and 104 of FIG. 1, which may be in communication with Computing Device 200 via any suitable communication channel, such as an Ethernet switch connection or the like.

In some exemplary embodiments, Computing Device 200 may comprise one or more Processor(s) 202. Processor 202 may be a Central Processing Unit (CPU), a microprocessor, an electronic circuit, an Integrated Circuit (IC) or the like.

Processor 202 may be utilized to perform computations required by Computing Device 200 or any of its subcomponents.

In some exemplary embodiments of the disclosed subject matter, Computing Device 200 may comprise an Input/Output (I/O) Module 205. The I/O Module 205 may be utilized to provide an output to and receive input from a user. Additionally or Alternatively, I/O Module 205 may be utilized to provide output to and receive input from Server 210 or another Computing Device 200 in communication therewith, such as another one of Devices 110 to 150 of FIG. 1.

In some exemplary embodiments, Computing Device 200 may comprise a Memory 207. Memory 207 may be a hard disk drive, a Flash disk, a Random Access Memory (RAM), a memory chip, or the like. In some exemplary embodiments, Memory 207 may retain program code operative to cause Processor 202 to perform acts associated with any of the subcomponents of Computing Device 200.

Memory 207 may comprise one or more components as detailed below, implemented as executables, libraries, static libraries, functions, or any other executable components.

Memory 207 may comprise Port Scrambler 220 which may comprise or be in communication with a Programs List 236 and one or more Shared Key(s) 232. Port Scrambler 220 may be configured to selectively apply a port scrambling function on port numbers associated with outgoing communications. Port Scrambler 220 may apply the port scrambling function responsive to receiving a request to transmit an outgoing communication from an application program listed on Programs List 236 (and executed by Computing Device 200). Port Scrambler 220 may use Shared Key(s) 232 as a parameter of the port scrambling function. Port Scrambler 220 may obtain a scrambled port number by applying the port scrambling function on the port number identifying the destination of the outgoing communication. Port Scrambler 220 may direct the outgoing communication to a destination identified by the scrambled port number.

Memory 207 may comprise Port Descrambler 228 which may comprise or be in communication with Shared Key(s) 232. Port Descrambler 228 may be configured to apply a port descrambling function on port numbers associated with incoming communications to Computing Device 200. The port descrambling function may be an inverse function of the port scrambling function applied by Port Scrambler 220. Port Descrambler 228 may use Shared Key(s) 232 as a parameter of the port descrambling function. Port Descrambler 228 may receive an incoming communication at a port identified by a scrambled port number. Port Descrambler 228 may obtain a descrambled port number by applying the port descrambling function on the scrambled port number. In some exemplary embodiments, Port Descrambler 228 may perform the descrambling on all incoming communications regardless of their origin. Port Descrambler 228 may redirect the incoming communication to a port identified by the descrambled port number. Port Descrambler 228 may issue a notification to Server 210 in case that the descrambled port number is not assigned to any application program currently executing on Computing Device 200.

Similarly to Computing Device 200, Server 210 may comprise Processor(s) (not shown), I/O Module (not shown) and Memory (not shown).

Server 210 may comprise a Key Distributor 212 for generating and distributing Shared Key(s) 232 among a plurality of computing devices, such as Computing Device 200, in a computer network environment such as Computer Network 100 of FIG. 1. Key Distributor 212 may distribute Shared Key 232 to Computing Device 200 using Public Key Infrastructure (PKI) cryptography. Shared Key 232 may comprise a fixed encryption key. Additionally or alternatively, Shared Key 232 may comprise a time-dependent encryption key, replaced periodically and valid for a limited time duration. In some exemplary embodiments, Shard Key(s) 232 may comprise three keys: a time dependent key that is updated periodically, a fixed key that uniquely identifies the organization in which the system of FIG. 2 is deployed, and a key which depends on Programs List 236, such as a hashing of Programs List 236.

Server 210 may comprise a List Updater 214 for maintaining and updating Programs List 236 among the plurality of computing devices in the network environment. List Updater 214 may provide credentials enabling verification of the content of Programs List 236 by Computing Device 200, for example by applying a hash function on Programs List 236 and digitally signing the result. The credentials may also be used for the scrambling or descrambling process, as one of the Shared Key(s) 232, and distributed by Key Distributor 212.

Server 210 may comprise a Time Synchronizer 216 for synchronizing system clocks among the plurality of computing devices in the network environment, in case that one or more of the Shared Key(s) 232 distributed by Key Distributor 212 are time-dependent.

Server 210 may comprise an Attack Detector 218, configured for tracking and analyzing traffic in the computer network environment in order to detect possible security attacks and outbreaks. Attack Detector 218 may receive and analyze notifications from Computing Device 200 concerning incoming communications for which the descrambled port number is not assigned to an application program.

In some exemplary embodiments, Key Distributor 212, List Updater 214, Time Synchronizer 216 and Attack Detector 218 may be deployed on one or more separate servers. In one embodiment, each of the above is deployed on a stand-alone and separate server.

Figure 3A:
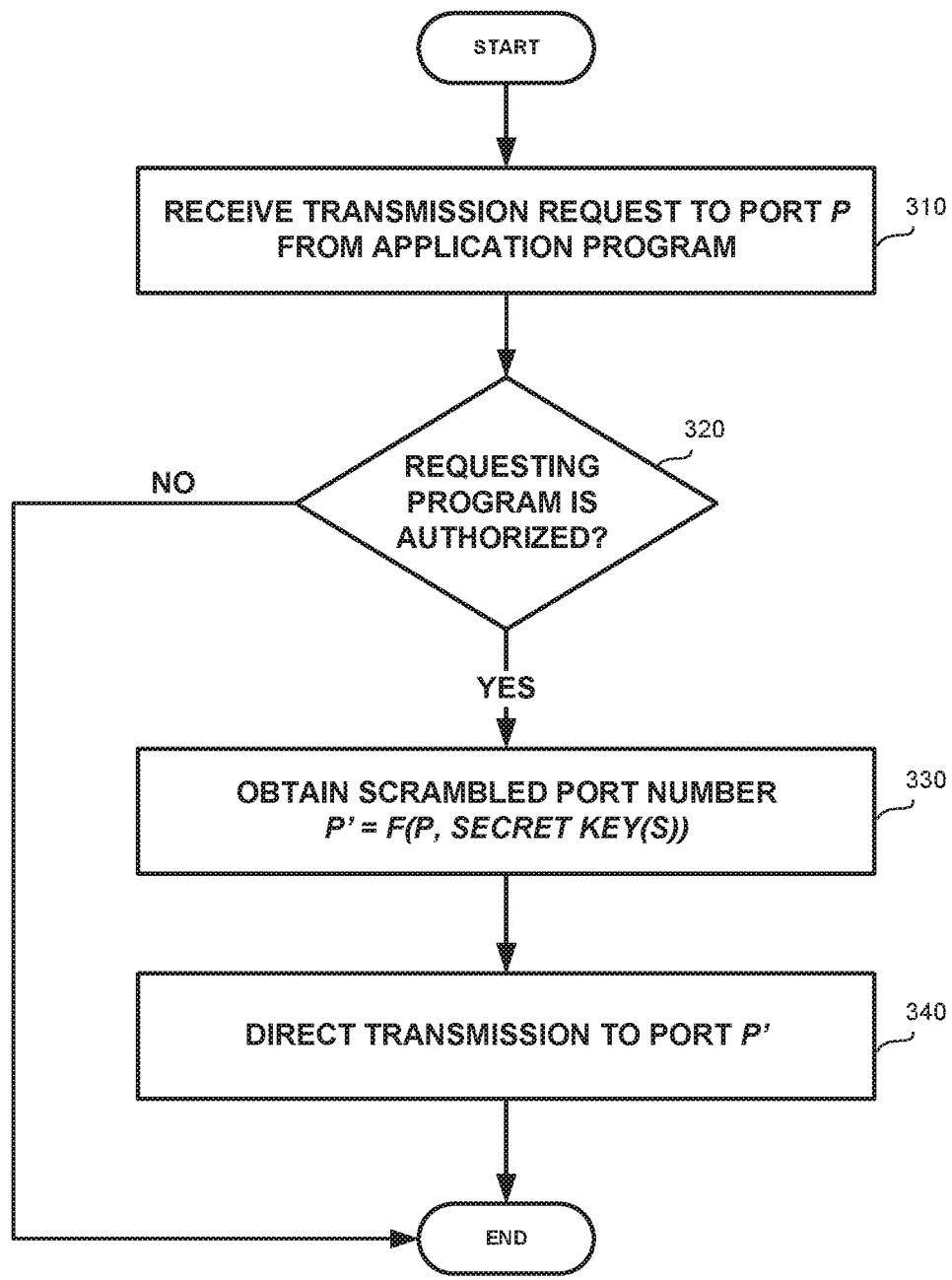
FIG. 3A shows a flowchart diagram of a method, in accordance with some exemplary embodiments of the disclosed subject matter.

Referring now to FIG. 3A showing a flowchart diagram of a method in accordance with some exemplary embodiments of the disclosed subject matter.

On Step 310, a request of an application program to transmit an outgoing communication may be received. The application program may be executed by a computerized apparatus, such as Computing Device 200 of FIG. 2. The outgoing communication may be designated to be received at a destination via a first port (denoted "P"). The destination may be a destination external to the computerized apparatus, e.g. another Computing Device 200. As an example, the destination of a UDP packet may be provided as an IP address and a port (e.g., 192.168.1.52:80).

On Step 320, a determination whether the requesting application program is authorized may be made. The determination may be accomplished by consulting a list of authorized programs, such as Programs List 236 of FIG. 2. In some exemplary embodiments, non-authorized programs may still operate in the computing device, however, in view of the disclosed subject matter, such programs may not be able to effectively communicate with other devices on the same network.

On Step 330, in case that the requesting application program was determined to be authorized on Step 320, a transformation function may be applied on an identifier of the first port to obtain an identifier of a second port. The transformation function may depend on at least one secret parameter shared among a plurality of computing devices in a computer network, such as Shared Key 232 of FIG. 2. The identifier of the first port may be obtained by applying an inverse transformation on the identifier of the second port. The inverse transformation may depend on the at least one secret parameter, such that only devices sharing the at least one secret parameter may be able to apply the inverse transformation. The transformation function may be either a symmetric cryptography function, such as DES, AES, or the like, or an asymmetric cryptography function, such as RSA, El-Gammal, or the like.

In some exemplary embodiments, the scrambled port number may not be a port number which has a general known functionality, such as port numbers known as "common port numbers" which are published by the Internet Assigned Number Authority (IANA) or the like. As an example, the scrambled port may not be port 20-21 (used for FTP), port 22 (used for SSH), port 53 (used for DNS), port 80 (used for HTTP), port 443 (used for HTTPS) or the like. On Step 330, in case the transformation function provides an excluded port, a next non-excluded port may be selected. Additionally or alternatively, a list of excluded ports may include common port numbers or other port numbers which are constantly excluded. The list may also include port numbers which were used as scrambled ports in a previous time segment. For example, in case port 80 was scrambled to port 1579 during a first time segment, in a next time segment, when port 80 is scrambled to a different port number, all other ports may be excluded from being scrambled to port 1579 so as to avoid collision and confusion. In such an embodiment, a packet that is destined to port 1579 and is received in the second segment may be uniquely identified as a packet that was transmitted during the first time segment towards port 80.

On Step 340, the outgoing communication may be directed to be received at the destination via the second port. In the above given example in which the original address is 192.168.1.52:80 and in which port 80 is scrambled to port 1579, the outgoing communication may be transmitted to 192.168.1.52:1579.

In some exemplary embodiments, a content of the at least one secret parameter may be updated in each of the plurality of computing devices in the network. As a result, operation of the transformation function may be dynamically and automatically modified for all computing devices in the network. In particular, a subsequent request to transmit an outgoing communication to be received via the first port, may result in the application of the transformation function on Step 330 yielding an identifier of a third port different from the second port. In some exemplary embodiments, the transformation function is modified without a user providing a modified definition thereof.

Figure 3B:
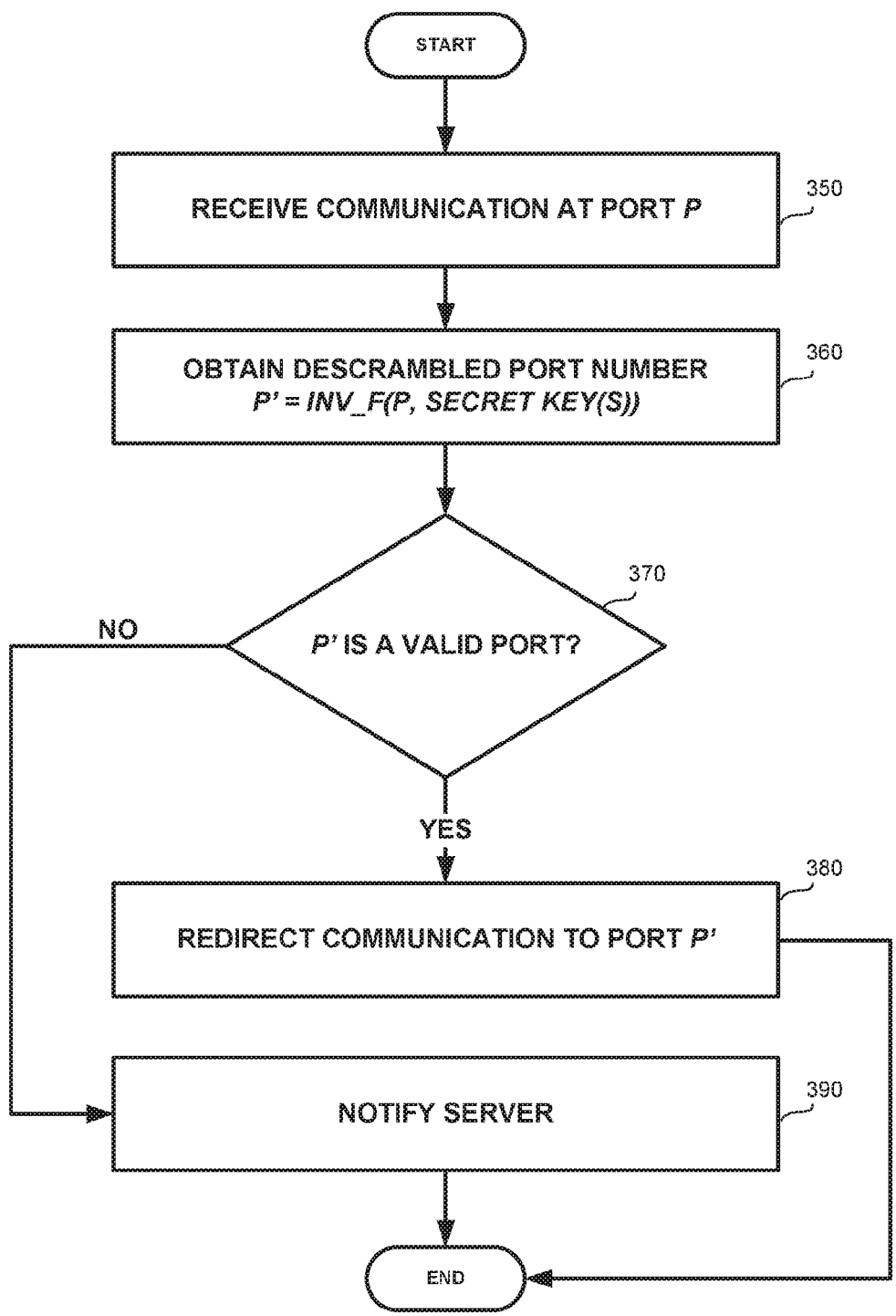
FIG. 3B shows a flowchart diagram of a method, in accordance with some exemplary embodiments of the disclosed subject matter.

Referring now to FIG. 3B showing a flowchart diagram of a method in accordance with some exemplary embodiments of the disclosed subject matter.

On Step 350, an incoming communication via a first port of a computerized apparatus, such as Computing Device 200 of FIG. 2, may be received. The incoming communication may be received from an external device via a computer network, such as Computer Network 100.

On Step 360, an identifier of a second port may be obtained by applying an inverse transformation function on an identifier of the first port. The inverse transformation function may depend on at least one secret parameter shared among a plurality of computing devices in the computer network, such as Shared Key 232 of FIG. 2.

On Step 370, a determination whether the second port is a valid port may be made. A valid port may be any port that is used by any of the programs in a list of authorized programs, such as Programs List 236 of FIG. 2. Additionally or alternatively, a valid port may be any common port. Additionally or alternatively, a valid port may be any port that is used by a program that is executed by the computerized apparatus.

On Step 380, in case that the second port was determined to be a valid port on Step 370, the incoming communication may be redirected to the second port. In some exemplary embodiments, subsequently, the incoming communication is received by a program and handled appropriately.

On Step 390, in case that the second port was determined as not being a valid port on Step 370, a corresponding notification may be issued to an entity in charge of tracking and analyzing network traffic for detecting attacks, such as Attack Detector 218 at Server 210 of FIG. 2. Additionally or alternatively, the received communication may be dropped and disregarded.

In some exemplary embodiments, a communication issued by an application that is not part of the list of authorized programs, such as Programs List 236 of FIG. 2, is not scrambled as described in FIG. 3A and thus is not received and handled by the desired final destination at the receiving device, as depicted in FIG. 3B. As a result, any non-authorized program that is executed by a device on the network is unable to effectively communicate with other devices.

In some exemplary embodiments, an unauthorized application is incapable of effectively accessing an external network to report to a malicious user. In order to communicate with a device in the external network, the device first needs to communicate with a router, bridge, switch or a similar device referred to as a router, which connects the network to the external network. Such communication may also be performed based on scrambled ports. As a result, and as the communication initiated by the unauthorized application is not scrambled, the router dismisses the communication and does not act upon it.

In some exemplary embodiments, communications in an organization's network may go through a firewall. The firewall may not be configured to handle port scrambling/descrambling. In such case, the transmitting device may determine that the packet is directly transmitted to a firewall and avoid port scrambling of such packet. Additionally or alternatively, a receiving device receiving a packet directly from a firewall, may avoid performing port descrambling on the received packet.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method comprising:
    receiving, in a computerized apparatus, a request of an application program to transmit an outgoing communication designated to be received at a destination via a first port, wherein the application program is executed by the computerized apparatus, wherein the destination is a destination external to the computerized apparatus;
    applying a transformation function on an identifier of the first port, whereby obtaining an identifier of a second port, wherein said applying is conditioned on the application program being listed in a list of authorized application programs for a plurality of devices in a computer network; and,
    directing the outgoing communication to be received at the destination via the second port;
    wherein the transformation function depends on at least one parameter shared among the plurality of devices, the at least one parameter comprising a parameter which depends on the list of authorized application programs, wherein the plurality of devices comprise the computerized apparatus, whereby a second computerized apparatus of the plurality of devices is enabled to apply an inverse transformation on the identifier of the second port to obtain the identifier of the first port.

2. The computer-implemented method of claim 1, wherein the at least one parameter is selected from the group consisting of: a fixed encryption key; a time-dependent encryption key; a combination of fixed and time-dependent keys.

3. The computer-implemented method of claim 1, wherein the at least one parameter comprises a time-dependent encryption key, wherein the computer network further comprises a server distributing and synchronizing time-dependent encryption keys among the plurality of devices.

4. The computer-implemented method of claim 1, wherein the list is verifiable by the plurality of devices.

5. The computer-implemented method of claim 1, wherein the computer network further comprises a server responsible for maintaining the list and updating the plurality of devices.

6. The computer-implemented method of claim 1 further comprising:
    receiving, in the computerized apparatus, an incoming communication via a third port having a third port identifier, wherein the incoming communication is received from an external device via the computer network;
    applying an inverse transformation function on the third port identifier, whereby obtaining a fourth port identifier of a fourth port, wherein the inverse transformation function is an inverse function of the transformation function and depends on the at least one parameter; and,
    redirecting the incoming communication from the third port to the fourth port.

7. The computer-implemented method of claim 6, wherein the third port is the second port; and, wherein the fourth port is the first port.

8. The computer-implemented method of claim 1 further comprising
    receiving, in the computerized apparatus, a subsequent request of an application program being executed by the computerized apparatus to transmit an outgoing communication designated to be received at a destination external to the computerized apparatus via the first port;
    applying the transformation function on the identifier of the first port, whereby obtaining an identifier of a third port different from the second port; and,
    directing the outgoing communication to be received at the destination via the third port.

9. The computer-implemented method of claim 1, further comprising: automatically updating a content of the at least one secret parameter in each device of the plurality of devices, whereby dynamically modifying operation of the transformation function for all devices of the plurality of devices.

10. The computer-implemented method of claim 1, wherein the destination external to the computerized apparatus is a device comprised by the plurality of devices.

11. A computer-implemented method comprising:
    receiving, in a computerized apparatus, an incoming communication via a first port having a first port identifier, wherein the incoming communication is received from an external device via a computer network;
    applying an inverse transformation function on the first port identifier, whereby obtaining a second port identifier of a second port; and,
    redirecting the incoming communication from the first port to the second port at the computerized apparatus, wherein the inverse transformation function depends on at least one parameter shared among a plurality of devices of the computer network, the at least one parameter comprising a parameter which depends on a list of authorized application programs for the plurality of devices, wherein the plurality of devices comprise the computerized apparatus.

12. The computer-implemented method of claim 11, wherein the at least one parameter is selected from the group consisting of: a fixed encryption key; a time-dependent encryption key; a combination of fixed and time-dependent keys.

13. The computer-implemented method of claim 11, further comprising issuing a notification to a server of the computer network responsive to the second port not being assigned to any application program.

14. The computer-implemented method of claim 11, wherein said incoming communication is an outgoing communication of the external device, wherein the outgoing communication is initiated by an application program of the external device and designated to be received at the computerized apparatus via the second port, wherein the outgoing communication is directed towards the computerized apparatus via the first port based on the external device applying a transformation function on the second port identifier to obtain the first port identifier, wherein the external device applying the transformation is conditioned on the application program being listed in the list of authorized application programs, wherein the inverse transformation function is an inverse function of the transformation function.

15. A computerized apparatus having a processor, the processor being adapted to perform the steps of:
    receiving, in a computerized apparatus, a request of an application program to transmit an outgoing communication designated to be received at a destination via a first port, wherein the application program is executed by the computerized apparatus, wherein the destination is a destination external to the computerized apparatus;
    applying a transformation function on an identifier of the first port, whereby obtaining an identifier of a second port, wherein said applying is conditioned on the application program being listed in a list of authorized application programs for a plurality of devices in a computer network; and, directing the outgoing communication to be received at the destination via the second port;

wherein the transformation function depends on at least one parameter shared among the plurality of devices, the at least one parameter comprising a parameter which depends on the list of authorized application programs, wherein the plurality of devices comprise the computerized apparatus, whereby a second computerized apparatus of the plurality of devices is enabled to apply an inverse transformation on the identifier of the second port to obtain the identifier of the first port.

16. A computerized apparatus having a processor, the processor being adapted to perform the steps of:

receiving, in a computerized apparatus, an incoming communication via a first port having a first port identifier, wherein the incoming communication is received from an external device via a computer network;

applying an inverse transformation function on the first port identifier, whereby obtaining a second port identifier of a second port; and, redirecting the incoming communication from the first port to the second port at the computerized apparatus, wherein the inverse transformation function depends on at least one parameter shared among a plurality of devices of the computer network, the at least one parameter comprising a parameter which depends on a list of authorized application programs for the plurality of devices, wherein the plurality of devices comprise the computerized apparatus.

17. A computer program product comprising a computer readable storage medium retaining program instructions, which program instructions when read by a processor, cause the processor to perform a method comprising:

receiving, in a computerized apparatus, a request of an application program to transmit an outgoing communication designated to be received at a destination via a first port, wherein the application program is executed by the computerized apparatus, wherein the destination is a destination external to the computerized apparatus;

applying a transformation function on an identifier of the first port, whereby obtaining an identifier of a second port, wherein said applying is conditioned on the application program being listed in a list of authorized application programs for a plurality of devices in a computer network; and, directing the outgoing communication to be received at the destination via the second port;

wherein the transformation function depends on at least one parameter shared among the plurality of devices, the at least one parameter comprising a parameter which depends on the list of authorized application programs, wherein the plurality of devices comprise the computerized apparatus, whereby a second computerized apparatus of the plurality of devices is enabled to apply an inverse transformation on the identifier of the second port to obtain the identifier of the first port.

18. A computer program product comprising a computer readable storage medium retaining program instructions, which program instructions when read by a processor, cause the processor to perform a method comprising:

receiving, in a computerized apparatus, an incoming communication via a first port having a first port identifier, wherein the incoming communication is received from an external device via a computer network;

applying an inverse transformation function on the first port identifier, whereby obtaining a second port identifier of a second port; and, redirecting the incoming communication from the first port to the second port at the computerized apparatus, wherein the inverse transformation function depends on at least one parameter shared among a plurality of devices of the computer network, the at least one parameter comprising a parameter which depends on a list of authorized application programs for the plurality of devices, wherein the plurality of devices comprise the computerized apparatus.

* * * * *